United States Patent
Sakagami

(10) Patent No.: US 10,529,299 B2
(45) Date of Patent: Jan. 7, 2020

(54) DISPLAY DEVICE, MULTI-DISPLAY SYSTEM, SPLIT VIDEO DISPLAY METHOD, AND PROGRAM

(71) Applicant: NEC Display Solutions, Ltd., Tokyo (JP)

(72) Inventor: Kazuma Sakagami, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 243 days.

(21) Appl. No.: 15/567,036

(22) PCT Filed: Apr. 21, 2015

(86) PCT No.: PCT/JP2015/062100
§ 371 (c)(1),
(2) Date: Oct. 16, 2017

(87) PCT Pub. No.: WO2016/170596
PCT Pub. Date: Oct. 27, 2016

(65) Prior Publication Data
US 2018/0090098 A1    Mar. 29, 2018

(51) Int. Cl.
*G09G 5/00* (2006.01)
*G03B 21/00* (2006.01)
(Continued)

(52) U.S. Cl.
CPC ............ *G09G 5/005* (2013.01); *G03B 21/00* (2013.01); *G06F 3/1423* (2013.01);
(Continued)

(58) Field of Classification Search
None
See application file for complete search history.

(56) References Cited

U.S. PATENT DOCUMENTS

2009/0147028 A1*  6/2009  Sefton ................. G06F 3/1446
                                                   345/690
2012/0257750 A1   10/2012  Bohm et al.
(Continued)

FOREIGN PATENT DOCUMENTS

JP      2000-276099 A     10/2000
JP      2007-193135 A      8/2007
(Continued)

OTHER PUBLICATIONS

International Search Report (ISR) (PCT Form PCT/ISA/210), in PCT/JP2015/062100, dated Jul. 28, 2015.

*Primary Examiner* — Duane N Taylor, Jr.
(74) *Attorney, Agent, or Firm* — McGinn IP Law Group, PLLC

(57) ABSTRACT

In a display device that is daisy-chained to a source device that outputs a video signal, and transmits an encryption key (KSV) used for encryption to source device, the display device includes storage to store the encryption key of an own display device (first device KSV), and the encryption keys (second device KSV, third device KSV) of all of downstream side display devices that are provided on a downstream side of the own display device among all of the other display devices that are daisy-chained, the encryption keys being transmitted to source device through its own display device when the display devices are daisy-chained to source device, and causes a display to form a split video image that is a part of a video image based on the number of splits of the video image corresponding to the video signal and the number of encryption keys stored.

13 Claims, 19 Drawing Sheets

(51) Int. Cl.
*G06F 3/14* (2006.01)
*G06F 21/84* (2013.01)
*G06T 5/50* (2006.01)
*H04N 5/232* (2006.01)
*H04N 5/268* (2006.01)
*H04N 9/31* (2006.01)
*G09G 5/12* (2006.01)
*G09G 5/14* (2006.01)

(52) U.S. Cl.
CPC ............ *G06F 3/1446* (2013.01); *G06F 21/84* (2013.01); *G06T 5/50* (2013.01); *H04N 5/232* (2013.01); *H04N 5/268* (2013.01); *H04N 9/3147* (2013.01); *H04N 9/3179* (2013.01); *G06F 2221/2107* (2013.01); *G09G 5/12* (2013.01); *G09G 5/14* (2013.01); *G09G 2340/04* (2013.01); *G09G 2358/00* (2013.01)

(56) References Cited

U.S. PATENT DOCUMENTS

| | | | |
|---|---|---|---|
| 2013/0181884 A1* | 7/2013 | Perkins | H04N 9/3147 345/1.3 |
| 2016/0094648 A1* | 3/2016 | Han | H04W 12/003 709/209 |
| 2016/0179455 A1* | 6/2016 | Liu | G06F 3/1454 345/2.2 |

FOREIGN PATENT DOCUMENTS

| | | |
|---|---|---|
| JP | 2007-240813 A | 9/2007 |
| JP | 2012-244271 A | 12/2012 |
| JP | 2014-164083 A | 9/2014 |
| WO | WO 2012/044078 A2 | 4/2012 |
| WO | WO 2014/064824 A1 | 5/2014 |
| WO | WO 2015/001664 A1 | 1/2015 |

* cited by examiner

1536 LINES

2048 DOTS

DISPLAY DEVICE, MULTI-DISPLAY SYSTEM, SPLIT VIDEO DISPLAY METHOD, AND PROGRAM

TECHNICAL FIELD

The present invention relates to a display device, a multi-display system, a split video display method, and a program.

BACKGROUND ART

As disclosed in Patent Literature 1, a multi-display system that displays a single video image using display devices such as a projector, or a monitor can display the video image on a larger screen at a higher resolution than a video image displayed using a single projector or a single monitor. Thus, the multi-display system is widely used in an event site, a showroom, or the like.

FIG. 1 is a perspective view illustrating a general configuration example of a multi-display system using projectors. In FIG. 1, two projectors 11, 12 that are connected in a row in a lateral (horizontal) direction (hereinafter referred to as a daisy chain connection) project video images based on a video signal output from PC (Personal Computer) 13 that is a source device to display them as a single video image. When the two projectors are used, the multi-display system is adapted to display the video images having double horizontal resolution. PC 13 and projector 11 are connected to projector 11 and projector 12, respectively, through HDMI (High-Definition Multimedia Interface) cables 14. The video signal indicating a single video image that is output from PC 13 is input to projectors 11 12. When user 16 sets a position for splitting a single video image by remote controller 15 to specify display regions of the video images displayed by projectors 11, 12, each projector projects the split video image corresponding to the specified display region to perform the multi-display.

CITATION LIST

Patent Literature

Patent Literature 1: JP2007-240813A

SUMMARY OF INVENTION

Technical Problem

As the example illustrated in FIG. 1, when specifying the display region of the video image displayed by each projector, user 16 directly performs a specification input to the projector or performs the specification input through remote controller 15 as illustrated in FIG. 1. In a case where it is difficult to directly perform the specification input to the projector because of a high installation position of the projector or the like, the user needs to set the display region of the video image by using the remote controller, therefore the operation is complicated and difficult to understand, and requires labor.

If the user mistakenly set the display region, there is also a problem that an unexpected video image will occur.

Furthermore, when a projector is replaced because of a failure or the like, the user needs to set the display region to the replaced projector again, which causes a problem of the user's operability.

It is an object of the present invention to provide a split video display method of displaying a split video image that is a part of an input video image and corresponds to each of display devices such as a projector, or a monitor that are daisy-chained, and the display device and a display system used for the split video display method.

Solution to Problem

A display device of the present invention is a display device that is daisy-chained to a signal source that outputs a video signal based on an encryption protocol, and transmits an encryption key used for encryption to the signal source, the display device including:

a display that forms a video image corresponding to the video signal;

a storage that stores the encryption key of an own display device, and the encryption keys of all of downstream side display devices that are provided on a downstream side of the own display device among all of the other display devices that are daisy-chained, the encryption keys being transmitted to the signal source through the own display device when the display devices are daisy-chained to the signal source; and a controller that causes the display to form a split video image that is a part of a video image based on the number of splits of the video image corresponding to the video signal and the number of encryption keys stored in the storage.

A multi-display device of the present invention includes the display devices configured as described above.

A split video display method according to the present invention is a split video display method performed by display devices that are daisy-chained to a signal source that outputs a video signal based on an encryption protocol, and transmit encryption keys used for encryption to the signal source, the split video display method including:

causing a display to form a video image corresponding to the video signal;

storing, in a storage, the encryption key of an own display device, and all of the encryption keys of all of downstream side display devices that are provided on a downstream side of the own display device among all of the other display devices that are daisy-chained, the encryption keys being transmitted to the signal source through the own display device when the display devices are daisy-chained to the signal source; and causing the display to form a split video image that is a part of a video image based on the number of splits of the video image corresponding to the video signal and the number of encryption keys stored in the storage.

A program according to the present invention is a program that causes a computer to execute a split video display method performed by display devices that are daisy-chained to a signal source that outputs a video signal based on an encryption protocol, and transmit encryption keys used for encryption to the signal source, the program causing the computer to execute the split video display method including:

causing a display to form a video image corresponding to the video signal;

storing, in a storage, the encryption key of an own display device, and all of the encryption keys of all of downstream side display devices that are provided on a downstream side of the own display device among all of the other display devices that are daisy-chained, the encryption keys being transmitted to the signal source through the own display device when the display devices are daisy-chained to the signal source; and causing the display to form a split video image that is a part of a video image based on the number of splits of the video image corresponding to the video signal and the number of encryption keys stored in the storage.

Advantageous Effect of Invention

According to the present invention, the split video image displayed by each display device can be easily displayed when the display devices are daisy-chained to the signal source to perform multi-display.

DESCRIPTION OF EMBODIMENTS

Figure 1:
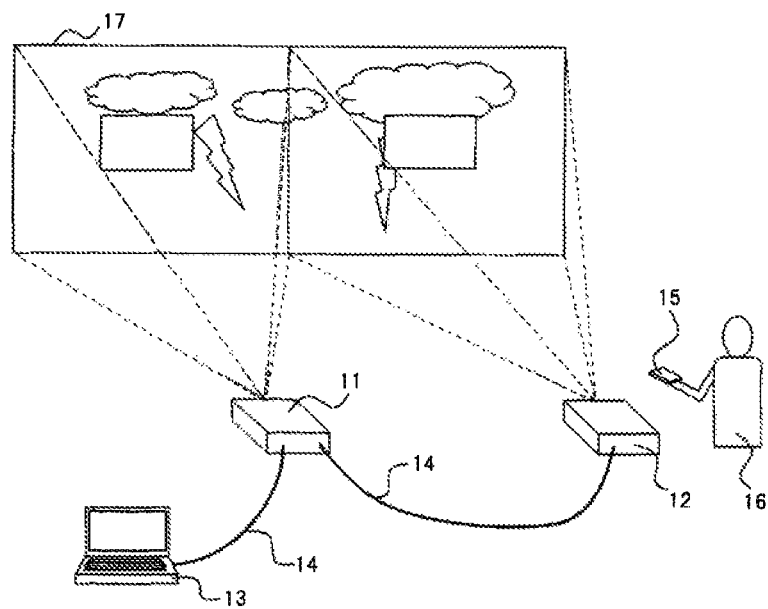
FIG. 1 is a perspective view illustrating a general configuration example of a multi-display system using projectors.

In the present invention, when a multi-display system is configured using display devices, each of the display devices displays a split video image that is a part of an input video image corresponding to a video signal input from a signal source and corresponds to its own display device, using a KSV (Key Selection Vector) used in HDCP (High-bandwidth Digital Content Protection) that is one of the copyright protection technologies, HDCP being used to communicate a digital video signal such as HDMI, DP (Display Port), DVI (Digital Visual Interface).

HDCP is one example of the encryption protocol in the video transmission, and is also referred to as an HDCP protocol. The KSV is one example of the encryption key used for encryption or decryption, and is also referred to as a public key. The KSV is a specific key assigned to each device corresponding to HDCP.

Among groups of display devices included in the multi-display system, a group of display devices arranged in a horizontal direction is regarded as a row, and a group of display devices arranged in a vertical direction is regarded as a column For example, when three display devices and four display devices are arranged in the horizontal and vertical directions, respectively, so that the total number of display devices is 12, the multi-display system includes the display devices arranged in four rows and three columns Note that it is not necessary that the number of display devices arranged in each row or the number of display devices arranged in each column be made all the same.

In HDCP, the display device (hereinafter also referred to as a sink device) and a relay device (hereinafter also referred to as a repeater device) require an authentication of a signal source (hereinafter also referred to as a source device) such as PC, or Blu-ray disk device. The display device is a device that displays a video image based on a video signal protected using HDCP, for example. The relay device is a device that is disposed between the source device and the sink device, and distributes the video signal protected using HDCP, for example. Note that the display device may be a device that is provided with a function of the repeater device. In the authentication process, when the sink device (repeater device) and the source device are connected through a video signal transmission cable that is a transmission path for transmitting the digital video signal such as HDMI, the sink device (repeater device) transmits a certificate and the KSV of its own sink device to the source device through the video signal transmission cable. The KSVs are transmitted to the source device from the sink device (repeater device) connected to the source device and all of the other sink devices (repeater devices) that are connected to the source device through the sink device (repeater device). The KSV is used to determine a key used for encryption. Thus, the KSV transmitted from the sink device (repeater device) is transmitted to the source device without being changed by the other sink devices. Hereinafter, the display device will be described as the sink device, and also described similarly as the repeater device.

For example, when sink devices are daisy-chained through the video signal transmission cables, the KSV transmitted from the sink device disposed at a distal end of the daisy chain is transmitted to the source device in a state of being originally transmitted, regardless of the sink devices through which the KSV passes. When passing through sink devices, the KSV is transmitted from each of the sink devices to the source device. At this time, each of the sink devices stores the KSV received from a lower-side sink device in a memory (storage) thereof, and transmits the KSV to an upper-side sink device or the source device. When the sink device is disconnected from the video signal transmission path connected with the lower-side sink device, the KSV received from the lower-side sink device is deleted from the memory of the sink device. Note that disconnecting the video signal transmission path includes turning off the power source of the lower-side sink device. In the daisy chain connection from the source device to the sink device disposed at the distal end, the source device side is regarded as an upstream side or an upper side, and the sink device side disposed at the distal end is regarded as a downstream side or a lower side.

The present invention utilizes a feature in that the number of KSVs to be stored by a predetermined sink device is increased as the number of sink devices through which the KSV passes is larger, when the sink devices are daisy-chained. In other words, the sink device stores the KSV transmitted to the source device from its own sink device, and displays a split video image that is a part of the video image corresponding to the video signal input from the source device based on the number of stored KSVs. Particularly, the sink device displays the split video image corresponding to its own sink device based on the number of splits of the video image corresponding to the input video signal and the number of KSVs stored in its own sink device. In addition, the sink device may determine a connection order of its own sink device based on the number of splits of the video image corresponding to the input video signal and the number of KSVs stored in its own sink device so as to display the split video image corresponding to the determined connection order. Note that the connection order is information indicating the order of connection to a reference device such as the source device or the sink device disposed at the distal end, for example. The connection order may be the order with respect to the total number of the display devices that are daisy-chained.

Each of the sink devices determines the number of connected sink devices and the connection order of its own sink device based on the number of splits of the video image and the number of KSVs stored in its own sink device, for example. Note that the number of splits of the video image is the same as the number of connected sink devices. For example, each of the sink devices may inform the other sink devices of the number of KSVs stored in its own sink device, and determine the number of connected sink devices and the connection order of its own sink device based on the number of KSVs informed from the other sink devices and the number of KSVs stored in its own device.

When the sink device can detect in the authentication process whether its own device is disposed on the most upstream side among all of the sink devices that are daisy-chained, the sink device disposed on the most upstream side may inform the other sink devices of the number of KSVs stored in its own sink device. For example, the source device informs the sink device of information indicating that its own device is a source device when the source device starts the authentication, so that the sink device can detect whether its own device is disposed on the most upstream side. In this case, each of the other sink devices (sink devices that are not disposed on the most upstream side) determines the connection order of its own sink device based on the number of KSVs stored in its own sink device and the number of KSVs informed from the sink device disposed on the most upstream side. Note that in a case of the daisy chain connection, the number of KSVs stored in the sink device disposed on the most upstream side is the same as the number of sink devices that are daisy-chained.

A part of installation conditions of the multi-display system is preset as arrangement rules. For example, the installation conditions of the multi-display system include a connection direction of the daisy chain connection, and a shape of the split video image in accordance with the number of rows, the number of columns, or the connection order in the multi-display system. The installation conditions may include the number of connected sink devices that are daisy-chained.

In terms of the connection direction of the daisy chain, when the multi-display system is configured in one row, for example, display devices are sequentially connected from a left end to a right end of the row, and when the multi-display system is configured in rows and columns, for example, display devices in each row are sequentially connected from a left end to a right end, and the display device at the right end of the row and the display device at the left end of a next lower row are connected to each other to connect between adjacent rows. When the multi-display system is configured in one column, display devices are sequentially connected from an upper end to a lower end. Note that when all or a part of the above display devices is connected in the reverse order or by changing the connection order, the split video image corresponding thereto may be changed in accordance with the connection direction.

The number of rows and the number of columns in the multi-display system is information indicating that the multi-display system is configured in one row, one column or m rows and n columns (m and n are natural numbers), for example. Note that since the number of connected display devices can be detected using the number of KSVs, when either the number of rows or the number of columns is preset, the video image can be displayed by the multi-display system including the display devices arranged in m rows and n columns.

The shapes of the split video images in accordance with the connection order are formed to show the split video images of the same size regardless of the connection order, for example. The shapes of the split video images in accordance with the connection order may be different from each other. In the multi-display system, the display devices are arranged based on the shapes the preset split video images, respectively.

In the multi-display system in which the connection direction, the number of rows, the number of columns and the shape of the display area are preset, the split video image displayed by each of the display devices can be specified with respect to the whole display image when the number of connected display devices and the connection order are determined. Each of the sink devices can display the split video image corresponding to its own device based on the number of connected sink devices and the connection order in the multi-display system.

The arrangement rules are, in other words, the rules of arrangement in accordance with the connection order when the display devices are daisy-chained to the signal source.

The present invention also includes a configuration in which an atmospheric pressure sensor is provided in the display device to use atmospheric pressure information detected by the atmospheric pressure sensor in addition to the configuration of using the KSV. The atmospheric pressure information is used and thereby is capable of detecting the number of rows in the arranged multi-display system. The atmospheric pressure sensor is an element that detects an atmospheric pressure using a pressure sensitive element and outputs the detected value as an electrical signal, for example, and an atmospheric pressure sensor capable of detecting with high resolution and high accuracy is commercially available. Since the atmospheric pressure difference of 0.1 hPa=10 Pa occurs at an attitude difference of about 1 m, the attitude difference can be obtained from the atmospheric pressure difference. A commercial product with high accuracy has a resolution of about 0.1 to 0.05 Pa (1 cm to 5 mm).

When the display devices are arranged in rows and columns, the display devices that project the video images to an upper portion are generally positioned higher than the display devices that project the video images to a lower portion. The atmospheric pressure sensor is provided in the display device taking into account the installation conditions and thereby is capable of discriminating a difference in height between the display devices based on the atmospheric pressure difference. The number of rows for vertically splitting the video image projected can be determined based of the difference in height between the display devices. By adding thereto the information about the number of connected display devices and the connection order obtained using the KSVs, each of the display devices can discriminate an area corresponding to its own device and display the video image on the discriminated area.

Embodiments of the present invention will be described with reference to the drawings below.

(First Exemplary Embodiment)

Figure 2:
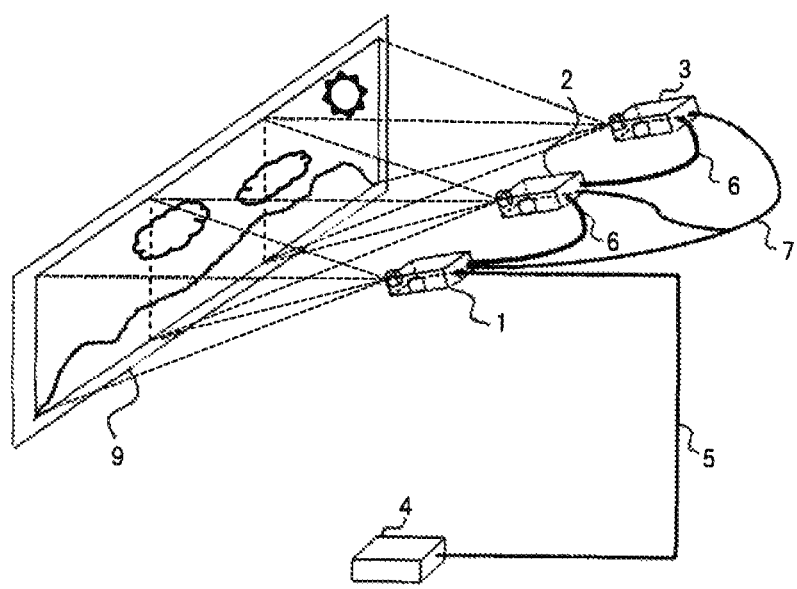
FIG. 2 is a perspective view illustrating a configuration of a multi-display system according to an exemplary embodiment (first exemplary embodiment) in which display devices according to the present invention are arranged in one row.

FIG. 2 is a perspective view illustrating a configuration of a multi-display system according to a first exemplary embodiment in which display devices according to the present invention are arranged in one row.

The system of the first exemplary embodiment is a system that displays a video image using display devices provided in one row, assuming that the display devices display split video images of the same size, respectively, and are daisy-chained from the display device that displays the split video image of a left end portion to the display device that displays the split video image of a right end portion.

Specifically, three projectors 1, 2, 3 (hereinafter also referred to as a first device, a second device, a third device, respectively) are daisy-chained through HDMI cables 6 that are the video signal transmission cables. Note that the video signal transmission cable may transmit information other than the video signal. The first to third devices are connected with one another through communicators that receive and transmit the information. The communicators are connected with all of the other projectors using a wired LAN, RS232C, a wireless LAN, DDC/CI, and/or CEC, for example. Note that when the information can be transmitted to and received from all of the other display devices using the video signal transmission cables, the wired LAN or the like may not be connected. In this case, the communicator is connected to at least a part of the video signal transmission cable. Also, the communicator may be configured as a part of a controller. In FIG. 2, the projectors are connected with one another through wired LAN cable 7 that creates a connection among the communicators or HUBs (not illustrated). Source device 4 is connected to the first device through digital video signal cable 5. Digital video signal cable 5 is a video signal transmission cable conforming to the standard such as DVI, HDMI, or DisplayPort, for example. Video light projected from each projector is projected to screen 9 that is a projection surface.

Among the three projectors, the first device that is directly connected with source device 4 is referred to as a master projector, and the second and third devices that are connected with source device 4 through the first device are referred to as slave projectors.

Figure 3:
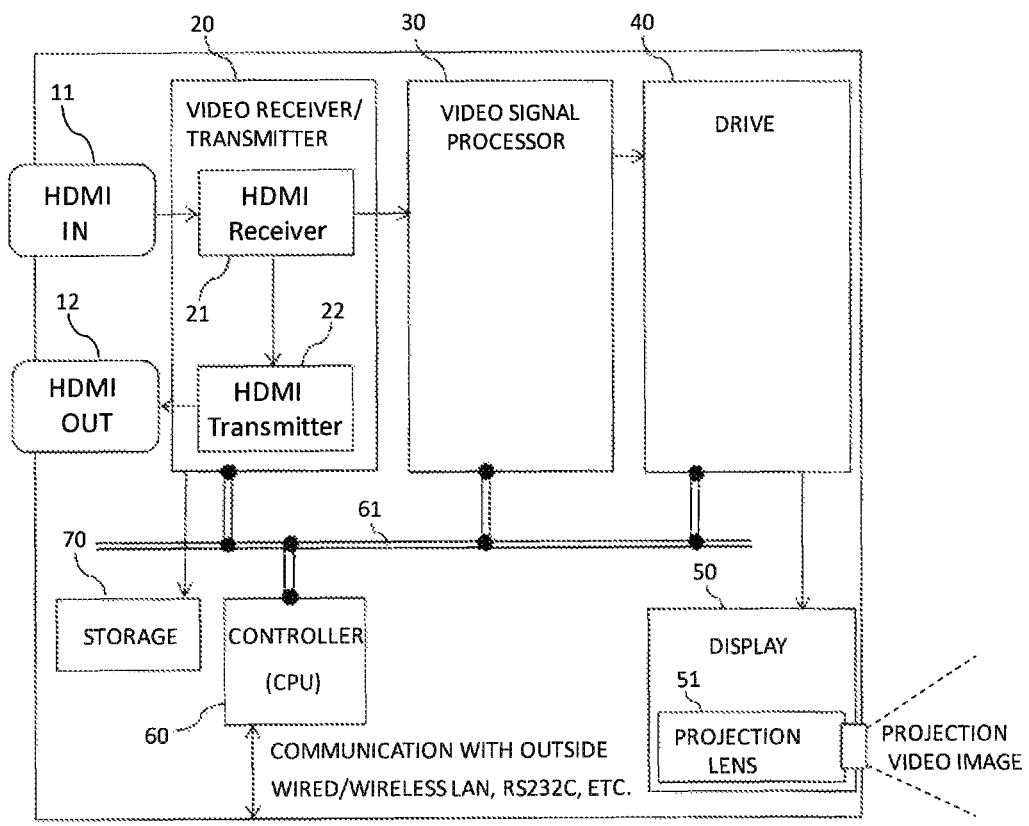
FIG. 3 is a block diagram illustrating an internal structure of each of projectors 1 to 3 illustrated in FIG. 2.

FIG. 3 is a block diagram illustrating an internal structure of each of projectors 1 to 3 illustrated in FIG. 2.

A projector illustrated in FIG. 3 includes input terminal (HDMI IN) 11, output terminal (HDMI OUT) 12, video receiver/transmitter 20, video signal processor 30, drive 40, display 50, controller 60, and storage 70. Video receiver/transmitter 20 includes receiver (HDMI Receiver) 21, transmitter (HDMI Transmitter) 22, and the like. Each of video receiver/transmitter 20, video signal processor 30, drive 40, display 50, and storage 70 is connected with controller 60 through bus (I2C, BUS) 61. Controller 60 controls the operation of each of video receiver/transmitter 20, video signal processor 30, drive 40, display 50, and storage 70 in accordance with a program stored in storage 70. Storage 70 stores the KSV of its own projector, and the KSVs of all of the projectors that are provided on the downstream side (downstream-side display devices) of its own projector among all of the other projectors (display devices) that are daisy-chained, the KSVs being transmitted to the signal source through its own projector, when the display devices are daisy-chained to the signal source. Storage 70 stores the arrangement rules assuming in the first exemplary embodiment that the display devices display the split video images of the same size, respectively, and are daisy-chained from the display device that displays the split video image of the left end portion to the display device that displays the split video image of the right end portion.

In the first exemplary embodiment, an HDMI signal is used as the video signal, and input terminal 11, output terminal 12, receiver 21, and transmitter 22 can process the HDMI signal, but may be configured to process the digital video signal such as DP, or DVI. Input terminal 11 is connected with the upper-side device through the video signal transmission cable (not illustrated), and receives a video signal and a control signal. The video signal received by input terminal 11 is transmitted to receiver 21 of video receiver/transmitter 20, and receiver 21 performs serial-parallel conversion, signal level conversion, decoding of a timing signal included in the control signal, and the like. There are various timing signals, and one of them is a data enable (DE) signal indicating an effective period that is a display period and an ineffective period that is a no-display period as display region information. When the slave projector is connected, output terminal 12 outputs the input video signal to the slave projector through transmitter 22.

The video signal subjected to processing such as conversion by receiver 21 is transmitted to video signal processor 30. Video signal processor 30 performs signal processing such as resolution conversion, γ correction, and trapezoidal distortion correction to the video signal transmitted from video receiver/transmitter 20, and transmits the signal to drive 40. Drive 40, in accordance with the video signal transmitted from video signal processor 30, drives a display element and a light source (both not illustrated) and the like included in display 50 to generate image light, and emits the image light from projection lens 51 of display 50. In other words, display 50 forms (displays) a video image corresponding to the input video signal.

Each of video receiver/transmitter 20, video signal processor 30, drive 40, display 50, and storage 70 described above are controlled by controller 60. Controller 60 is connected with each of video receiver/transmitter 20, video signal processor 30, drive 40, display 50, and storage 70 through bus 61, but may be connected with a controller of the other projector through a wired LAN.

Figure 4A:
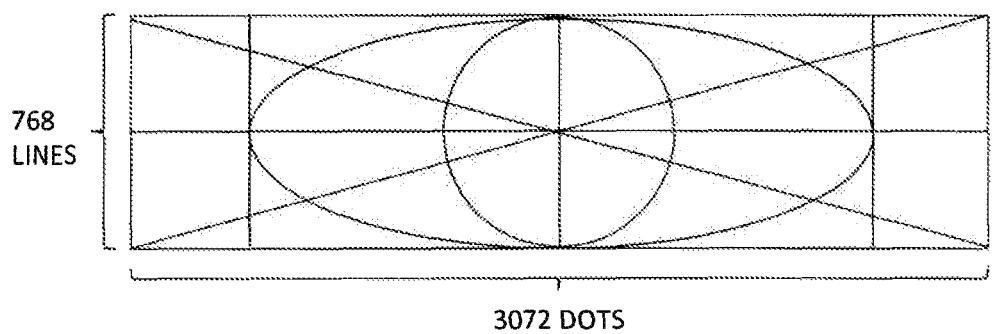
FIGS. 4(A), 4(B) are diagrams that show a video image corresponding to a video signal output from source device 4 in the first exemplary embodiment, and a DE signal thereof, respectively.
Figure 4B:
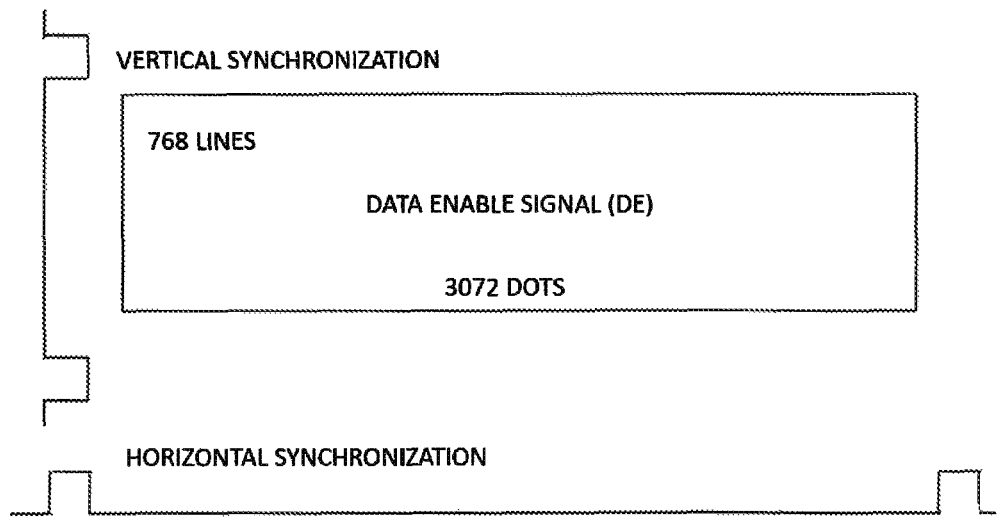

FIGS. 4(A), 4(B) are diagrams that show a video image corresponding to a video signal output from source device 4 in the first exemplary embodiment, and a DE signal thereof, respectively.

Figure 5A:
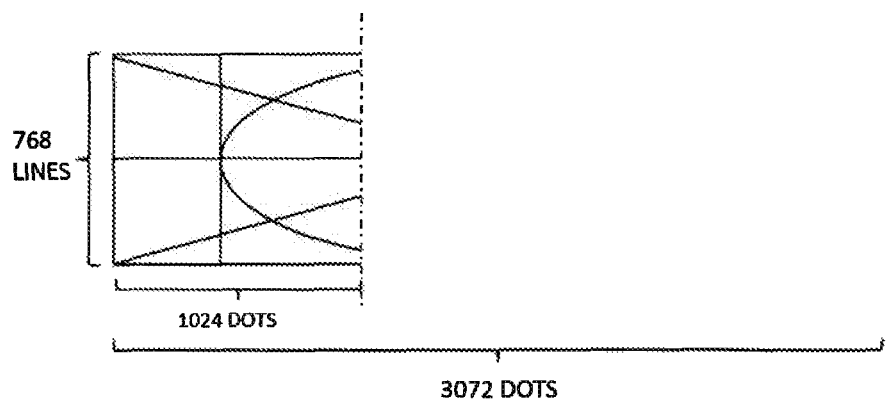
FIGS. 5(A), 5(B) are diagrams that show the split video image projected from projectors 1 illustrated in FIG. 2 and a DE signal thereof, respectively.
Figure 5B:
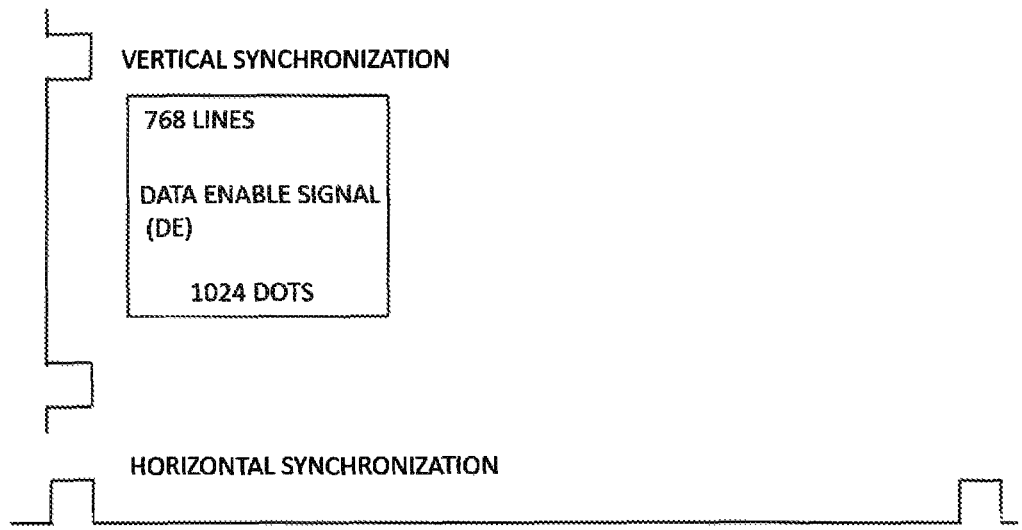
Figure 6A:
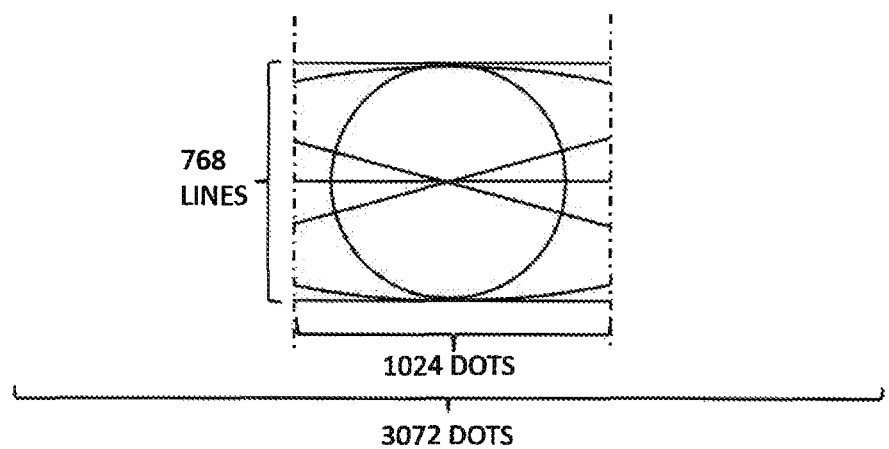
FIGS. 6(A), 6(B) are diagrams that show the split video image projected from projectors 2 illustrated in FIG. 2 and a DE signal thereof, respectively.
Figure 6B:
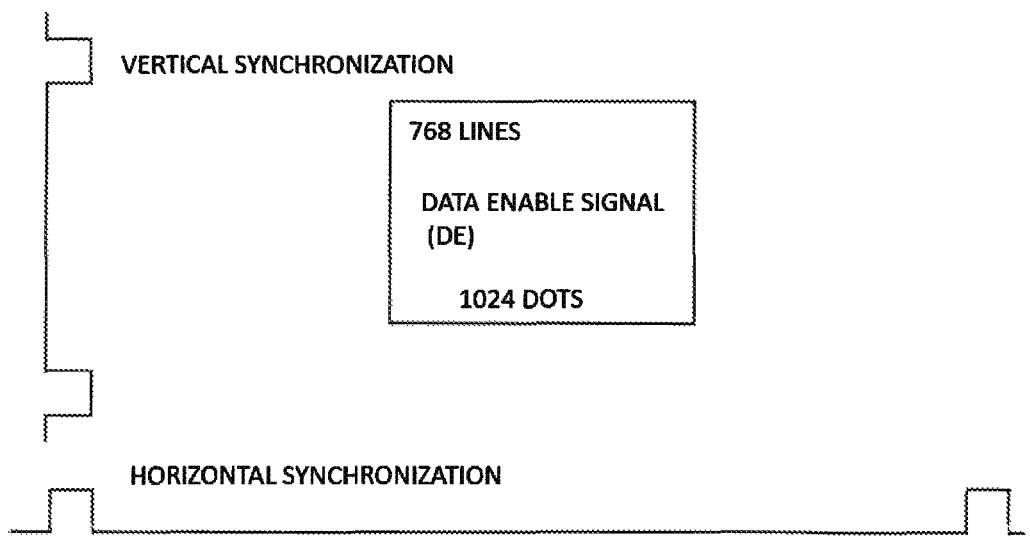
Figure 7A:
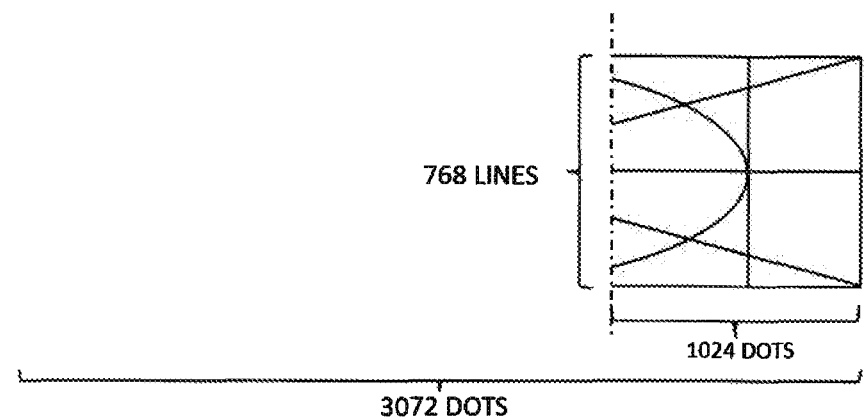
FIGS. 7(A), 7(B) are diagrams that show the split video image projected from projectors 3 illustrated in FIG. 2 and a DE signal thereof, respectively.
Figure 7B:
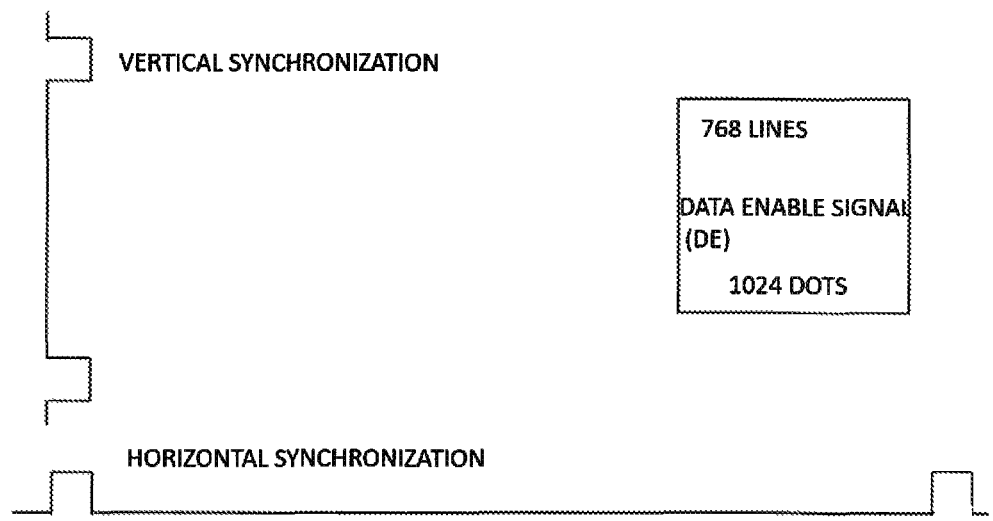

In the first exemplary embodiment, as shown in FIG. 4(A), a video image having a size of 3072 dots×768 lines is projected. The video image having this size is formed by arranging three video images each having the XGA-size of 1024 dots×768 lines side by side. The DE signal also has the same size as the video image as illustrated in FIG. 4(B). In the first exemplary embodiment, three projectors 1 to 3 are used to display the video image having the above size, and therefore the video image is split into three split video images. FIGS. 5 to 7 are diagrams that each show the split video image projected from each of projectors 1 to 3 and the DE signal thereof. FIGS. 5(A), 6(A), 7(A) each show the split video image, and FIGS. 5(B), 6(B), 7(B) each show the DE signal.

Figure 8:
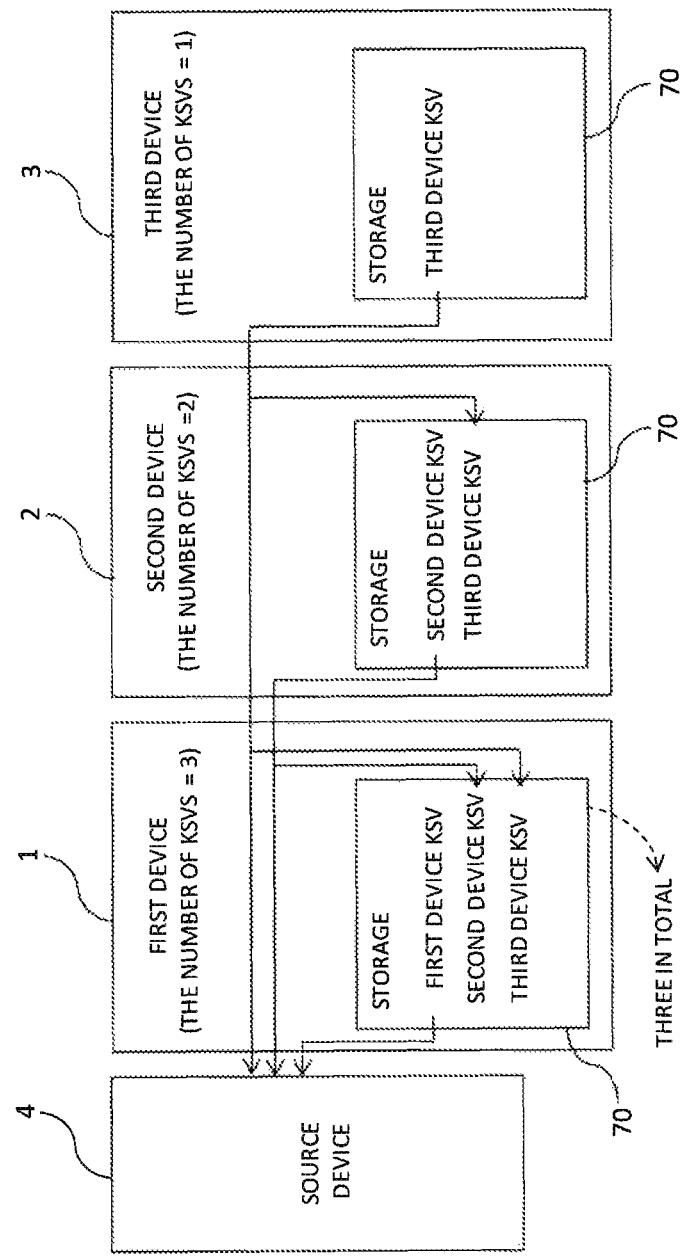
FIG. 8 is a diagram illustrating transmission states of KSVs in the first exemplary embodiment.

FIG. 8 is a diagram illustrating transmission states of KSVs.

For example, the KSV of the first device is transmitted to source device 4 when input terminal 11 of the first device is connected to source device 4 (see FIG. 2) after output terminal 12 of the first device is connected with input terminal 11 of the second device, and output terminal 12 of the second device is connected with input terminal 11 of the third device. The KSV of the second device is transmitted to source device 4 through the first device. The KSV of the third device is transmitted to source device 4 through the first and second devices. The KSV of the third device is stored in storage 70 of the second device when passing through the second device. The KSV of the second device and the KSV of the third device are stored in storage 70 of the first device when passing through the first device.

The KSV stored in the projector, when the projector is disconnected from the other device (including turning off the power source of the device), is deleted. When the projector is connected with the other device again, the above-described procedures are performed again, and the KSV of each projector is stored. For example, when the second device is replaced because of a failure or the like, and the devices are connected to one another, the KSV is similarly stored in the replaced second device.

As described above, the number of KSVs to be transmitted is increased as the number of sink devices through which the KSV passes is larger. As illustrated in FIG. 8, the third device stores one KSV of its own projector in storage 70 thereof, the second device stores two KSVs of its own projector and the third device in storage 70 thereof, the first device stores two KSVs of the second and third devices and one KSV of its own projector (three KSVs in total) in storage 70 thereof, and the first to third devices transmit the KSV(s) to source device 4.

Controller 60 of each projector informs controllers 60 of all of the other projectors that are daisy-chained of the number of KSVs transmitted to source device 4, in other words, the number of KSVs stored in storage 70 through the communicator. Controller 60 of each projector determines the number of splits of the video image corresponding to the video signal output from source device 4 based on the informed number of KSVs and the number of KSVs stored in storage 70 of its own projector. For example, controller 60 of each projector determines, as the number of splits of the video image, the maximum number of KSVs among the number of KSVs informed from each of all of the other projectors and the number of KSVs stored in storage 70 of its own projector. In other words, the number of splits of the video image is the maximum number of KSVs among the number of KSVs informed from each of the other projectors and the number of KSVs stored in storage 70. Note that the maximum number of KSVs is the same as the number of projectors that are daisy-chained. That is, the number of splits of the video image corresponds to the number of projectors that are daisy-chained. Controller 60 may determine the number of connected projectors as the number of splits of the video image.

Controller 60 of each projector determines the connection order of its own projector by comparing between the number of KSVs stored in storage 70 of its own projector (hereinafter also referred to as the number of KSVs stored in the own device) and the determined number of connected projectors (the number of splits of the video image). For example, when the number of KSVs stored in its own device is the same as the number of connected display devices (the number of splits of the video image), the controller determines that its own display device is disposed on the most upstream side among all of the display devices that are daisy-chained. When the number of KSVs stored in its own device differs from the number of the number of connected display devices, the controller determines that its own display device is not disposed on the most upstream side among all of the display devices that are daisy-chained. Specifically, when the number of KSVs stored in its own device is the same as the number of connected display devices (the number of splits of the video image), the controller determines that its own device is connected to source device 4 as a first-order device (connection order=1). When the number of KSVs stored in its own device is smaller by one than the number of connected display devices (the number of splits of the video image), the controller determines that its own device is connected to source device 4 as a second-order device (connection order=2). When the number of KSVs stored in its own device is smaller by two than the number of connected display devices (the number of splits of the video image), the controller determines that its own device is connected to source device 4 as a third-order device (connection order=3). When the number of KSVs stored in its own device is smaller by L (L is a natural number) than the number of connected display devices (the number of splits of the video image)=$K_{max}$ ($K_{max}$ is a natural number), the controller determines that its own device is connected to source device 4 as a ($K_{max}$−L+1)st-order device (connection order=($K_{max}$−L+1)). Hereinafter, the controller determines in the same way until the connection order becomes $K_{max}$ corresponding to $K_{max}$ that represents the maximum number of KSVs.

When the number of connected display devices (the number of splits of the video image) is predetermined, controller 60 need not receive the number of KSVs from the other display device. In this case, the controller may determine the connection order of its own device based on the predetermined number of connected display devices (the number of splits of the video image) and the number of KSVs stored in its own device.

Figure 9:
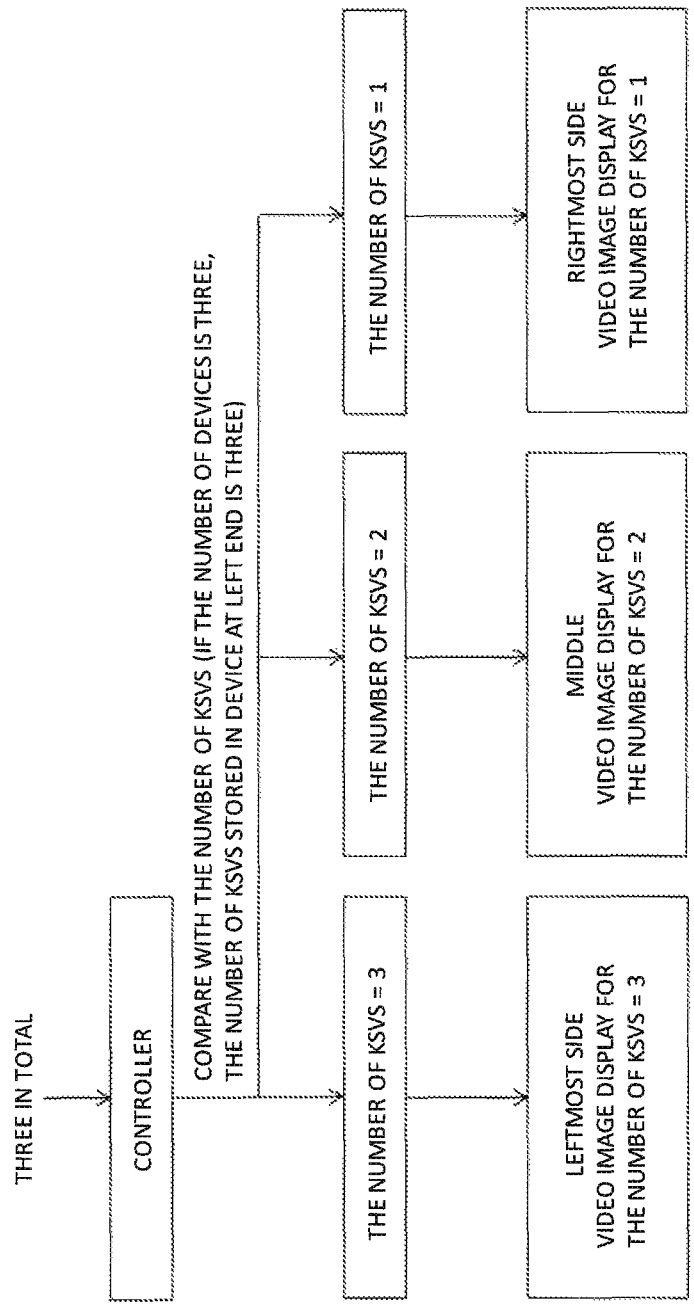
FIG. 9 is a flowchart illustrating a process of determining a video image area corresponding to a projector that determines the number of connected projectors in the first exemplary embodiment.

FIG. 9 is a flowchart illustrating a process of displaying the split video image by the projector based on the number of connected projectors (the number of splits of the video image).

Controller 60 of each projector determines connection order in which the projector is connected among three projectors that are connected to one another (the total number of projectors) by comparing between the information that the number of connected projectors (the number of splits of the video image) is three and the number of KSVs stored in storage 70. Based on the arrangement rules that the display devices display the split video images of the same size, respectively, and are daisy-chained from the display device that displays the split video image of the left end portion to the display device that displays the split video image of the right end portion, controller 60 determines that the display device is disposed on the leftmost side (connection order=1) among three display devices when the number of KSVs is three, that the display device is disposed in the middle (connection order=2) among the three devices when the number of KSVs is two, and that the display device is disposed on the rightmost side (connection order=3) among the three devices when the number of KSVs is one. Then, controller 60 causes its own display device to display a split video image corresponding to the determined connection order. For example, if the connection order is 1, the leftmost display device displays the split video image. That is, controller 60 causes display 50 to form the split video image that is a part of the video image input from the signal source based on the number of connected display devices (the number of splits of the video image) and the number of KSVs stored in the storage. Note that the split video image is located at a position corresponding to the number of encryption keys stored in storage 70 among the split video images formed by splitting the video image by the number of connected display devices (the number of splits of the video image).

As described above, controller 60 determines which one of the video images shown in FIG. 5 to FIG. 7 corresponds to the split video image projected by its own projector, and outputs the video signal corresponding to the display region for its own projector from video signal processor 30 to drive 40 to project the split video image. Thus, the first exemplary embodiment enables its own display device to display the split video image corresponding to its own display device using the encryption key and thereby is easily capable of displaying the split video image displayed by each display device when the display devices are daisy-chained to the signal source to perform multi-display.

Note that in the first exemplary embodiment, the arrangement rules are stored in storage 70, but may not be stored. For example, when the arrangement rules such as two rows and one column (the number of connected display devices is two), one row and three columns (the number of connected display devices is three), or three rows and three columns (the number of connected display devices is nine), and the connection direction of the daisy chain are predetermined, the arrangement rules may not be stored in storage 70. In this case, the input video image is split based on the predetermined arrangement rules to display the split video image that is located at a position corresponding to the number of KSVs stored in the storage.

(Second Exemplary Embodiment)

A second exemplary embodiment of the present invention will be described below.

Figure 10:
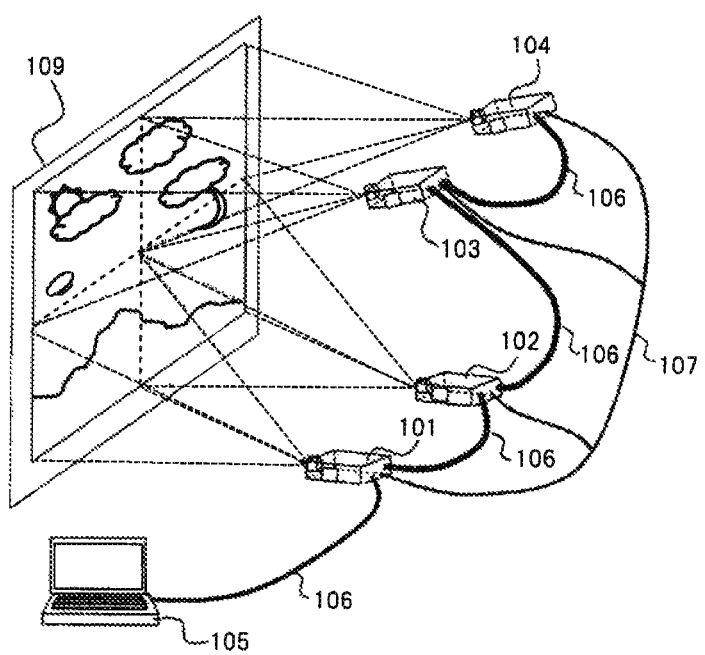
FIG. 10 is a diagram illustrating a configuration of a multi-display system in which display devices according to a second exemplary embodiment of the present invention are arranged in m rows and n columns.

FIG. 10 is a diagram illustrating a configuration of a multi-display system in which display devices according to the second exemplary embodiment of the present invention are arranged in m rows and n columns.

The system of the second exemplary embodiment is a system that displays a video image using display devices provided in m rows and n columns, assuming that the display devices display split video images of the same size, respectively, and are daisy-chained from the display device that displays the split video image of a left and lower end portion and to the display device that displays the split video image of a right and upper end portion, that is, from a left side to a right side and from a lower side to an upper side.

Figure 11:
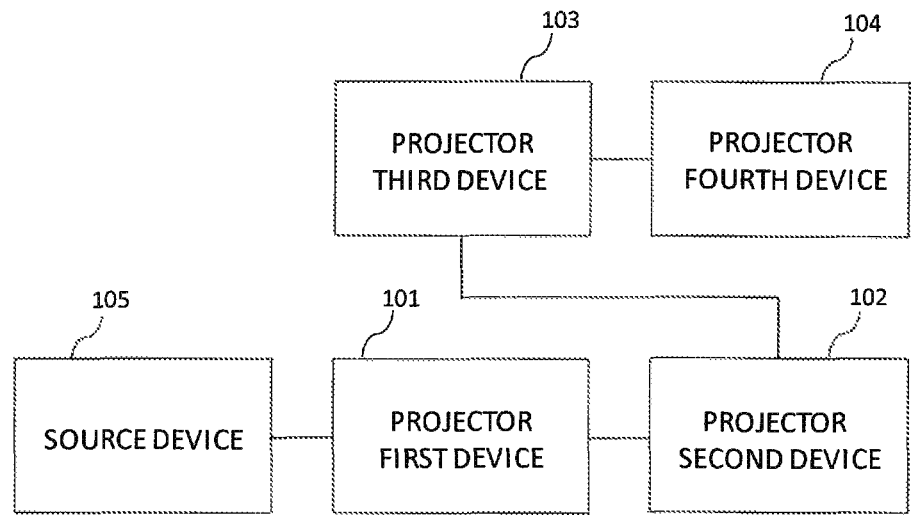
FIG. 11 is a diagram illustrating an arrangement of projectors that are daisy-chained and the connection order of the projectors in the second exemplary embodiment.

Specifically, projectors are daisy-chained from the left side to the right side and from the lower side to the upper side as illustrated in FIG. 11.

In the system illustrated in FIG. 10, four projectors 101, 102, 103, 104 (hereinafter also referred to as a first device, a second device, a third device, a fourth device, respectively) are daisy-chained through HDMI cables 106 as in the first exemplary embodiment. The first to fourth devices are connected using a wired LAN, RS232C, a wireless LAN, DDC/CI, CEC, or the like. In FIG. 10, the projectors are connected with one another through wired LAN cable 107 or HUBs (not illustrated). Source device 105 is connected to the first device through digital video signal cable 106 (DVI, HDMI, DisplayPort). Video light projected from each projector is projected to screen 109.

As in the first exemplary embodiment, the first device that is directly connected with source device 105 is referred to as a master projector, and the second to fourth devices that are connected with source device 4 through the first device are referred to as slave projectors.

FIG. 11 is a diagram illustrating an arrangement of projectors that are daisy-chained and the connection order of the projectors. In the second exemplary embodiment, a projector disposed at a left and lower side is connected to source device 105. The projectors are sequentially connected from the left side, through the right side, to the left side higher by one stage. Then, the projector at a right and upper side is disposed at the distal end of the daisy chain.

Figure 12:
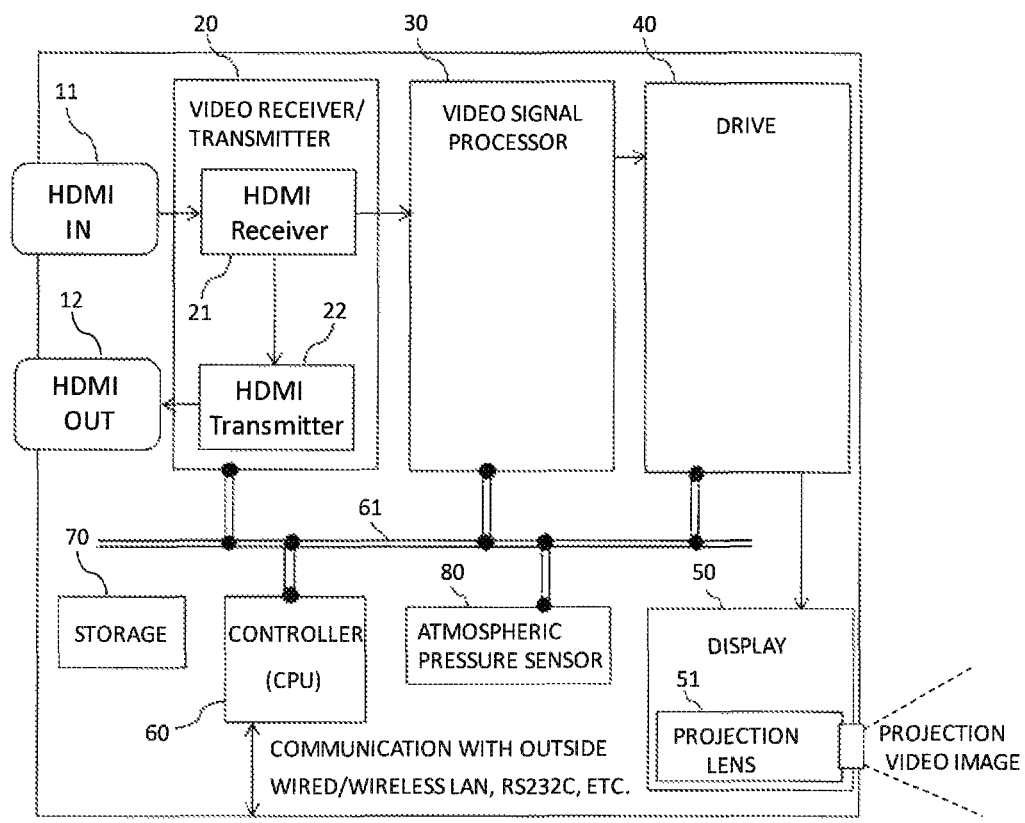
FIG. 12 is a block diagram illustrating an internal structure of each of projectors 101 to 104 illustrated in FIG. 10.

FIG. 12 is a block diagram illustrating an internal structure of each of projectors 101 to 104 illustrated in FIG. 10. Basic configuration and operation of each of projectors 101 to 104 are the same as those of projectors 1 to 3 of the first exemplary embodiment illustrated in FIG. 3, elements performing the same operations are assigned with the same reference numerals as those in FIG. 3, and the description thereof is omitted. Storage 70 of the second exemplary embodiment stores the arrangement rules assuming that the display devices display split video images of the same size, respectively, and are daisy-chained from the display device that displays the split video image of a left and lower end portion and to the display device that displays the split video image of a right and upper end portion, that is, from the left side to the right side and from the lower side to the upper side.

Projectors 101 to 104 of the second exemplary embodiment is provided with atmospheric pressure sensor 80. The atmospheric pressure information measured by atmospheric pressure sensor 80 is transmitted to controller 60 through bus 60. Controller 60 of the slave projector transmits the atmospheric pressure information of its own projector to controller 60 of the master projector.

Figure 13A:
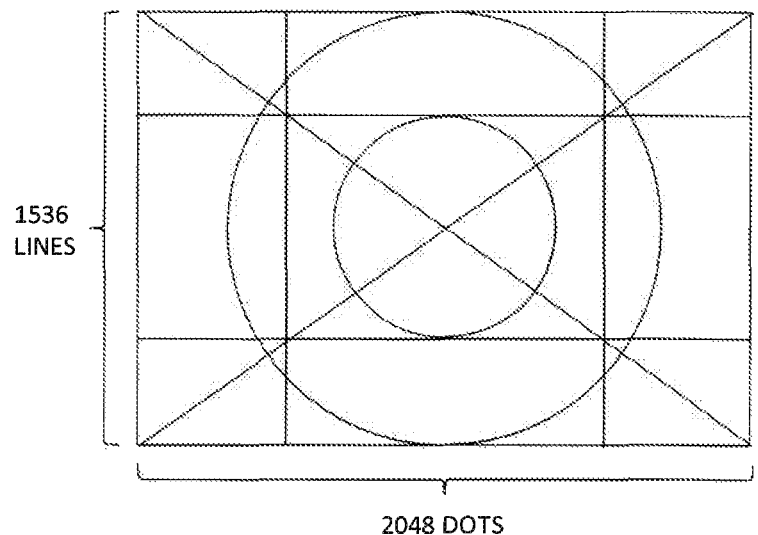
FIGS. 13(A), 13(B) are diagrams that show a video image projected corresponding to a video signal output from source device 105 in the second exemplary embodiment, and a DE signal thereof, respectively.
Figure 13B:
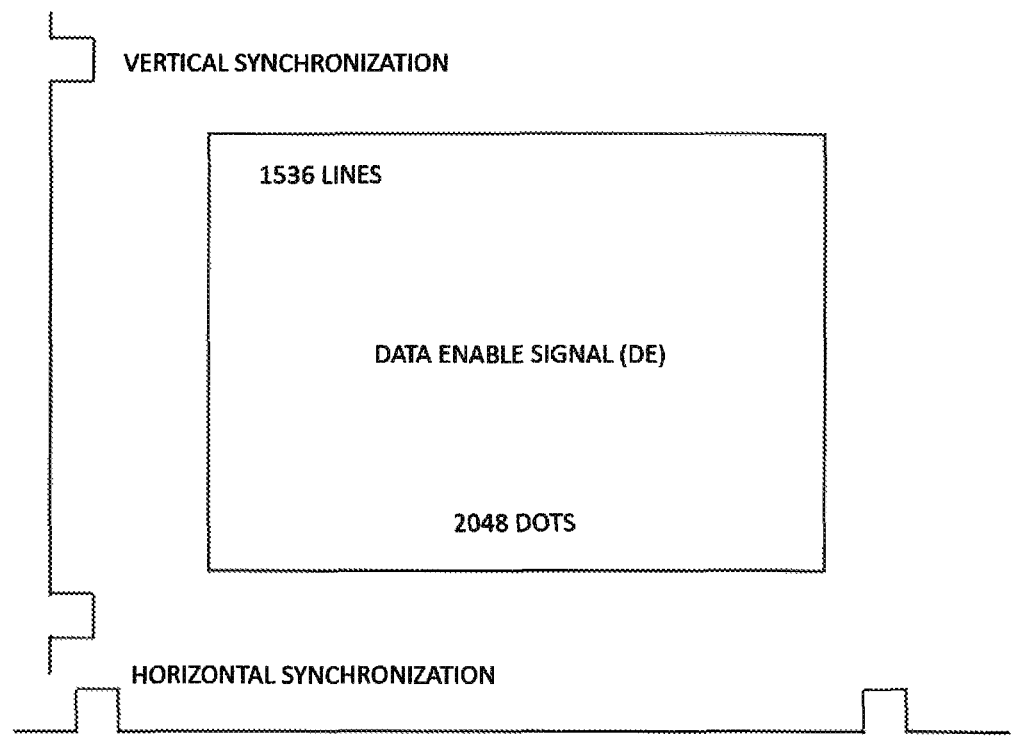
Figure 14A:
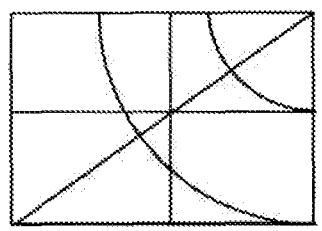
FIGS. 14(A), 14(B) are diagrams that show the split video image projected from projectors 101 illustrated in FIG. 10 and the DE signal thereof, respectively.
Figure 14B:
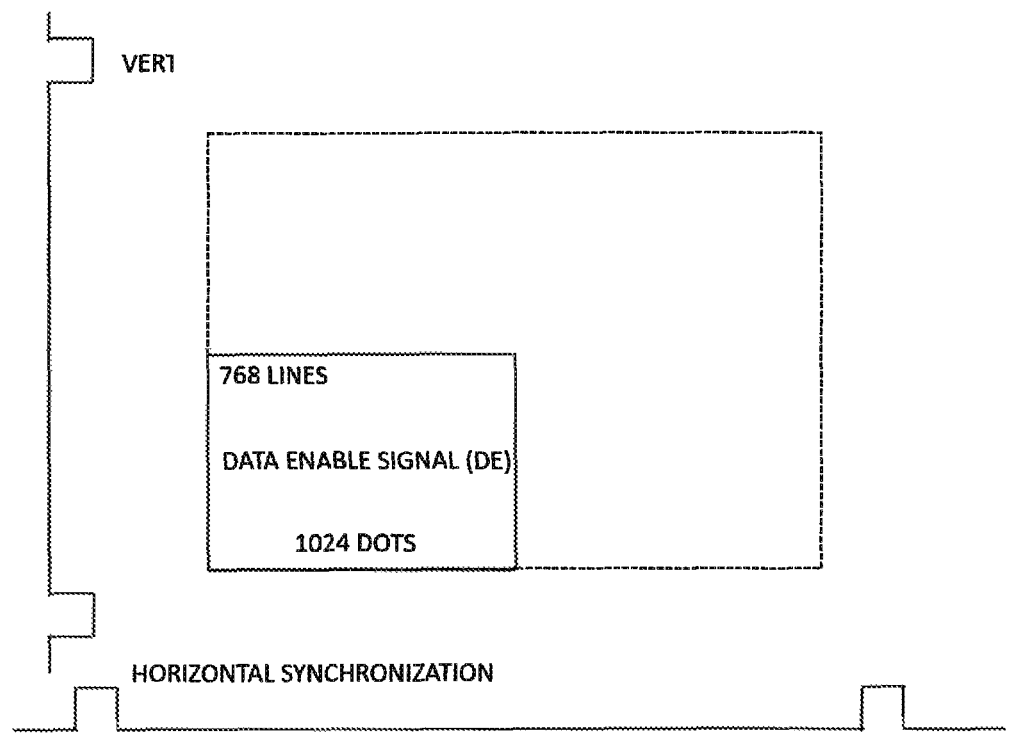
Figure 15A:
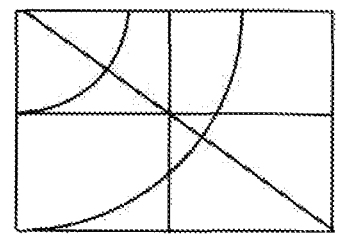
FIGS. 15(A), 15(B) are diagrams that show the split video image projected from projectors 102 illustrated in FIG. 10 and the DE signal thereof, respectively.
Figure 15B:
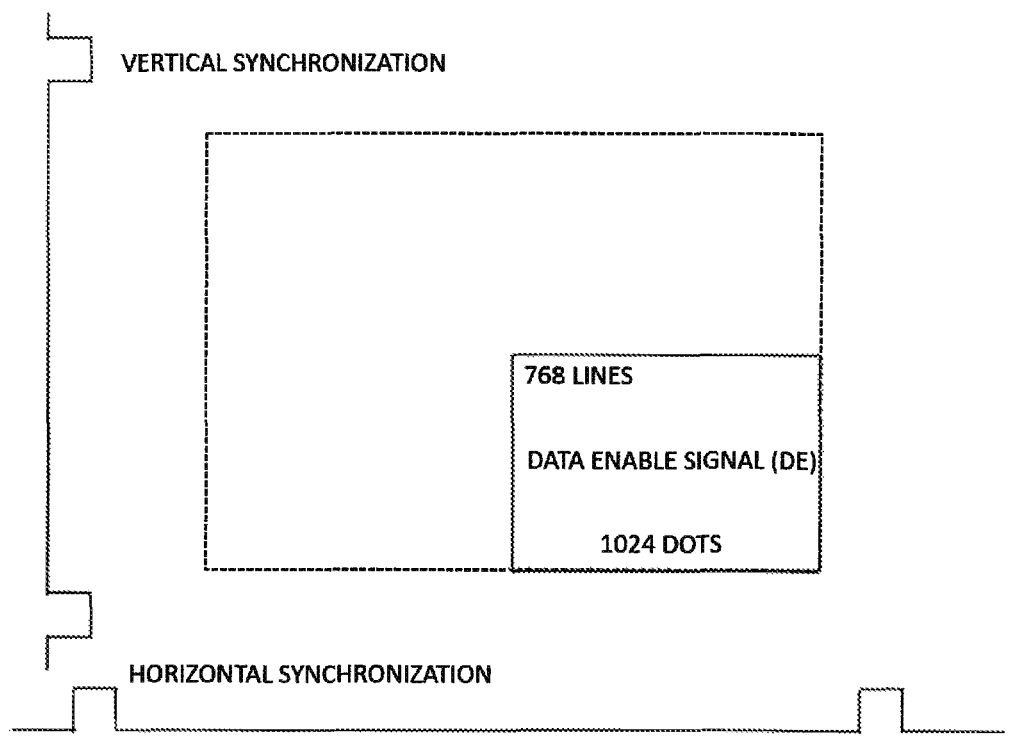
Figure 16A:
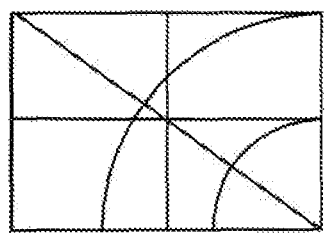
FIGS. 16(A), 16(B) are diagrams that show the split video image projected from projectors 103 illustrated in FIG. 10 and the DE signal thereof, respectively.
Figure 16B:
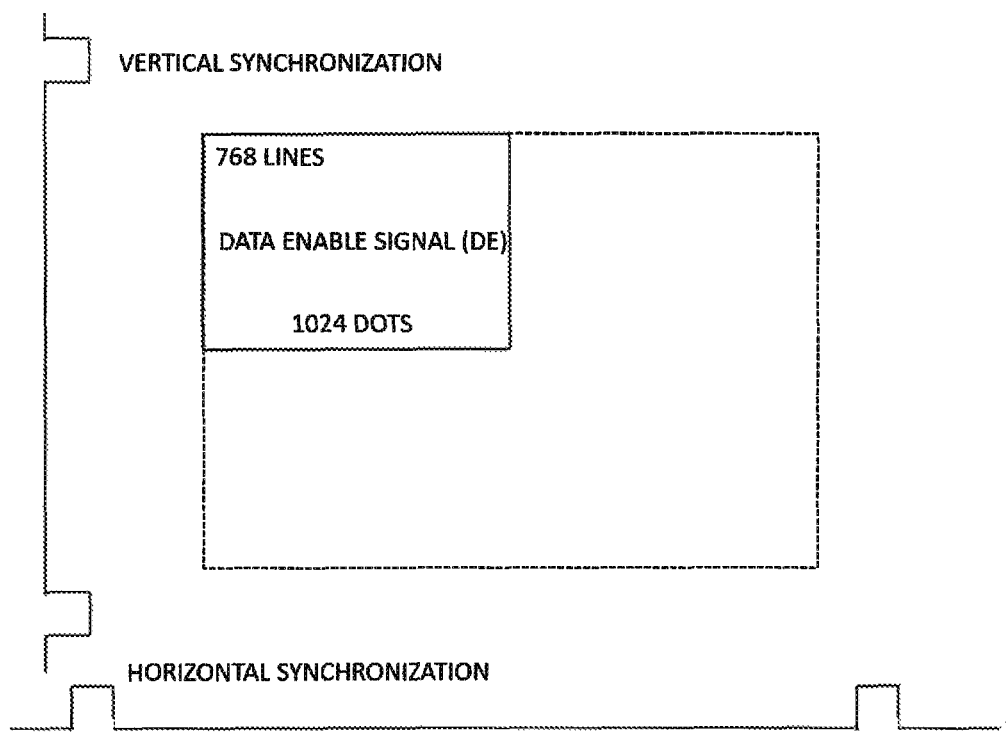
Figure 17A:
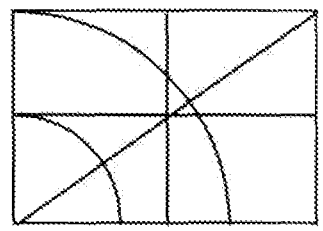
FIGS. 17(A), 17(B) are diagrams that show the split video image projected from projectors 104 illustrated in FIG. 10 and the DE signal thereof, respectively.
Figure 17B:
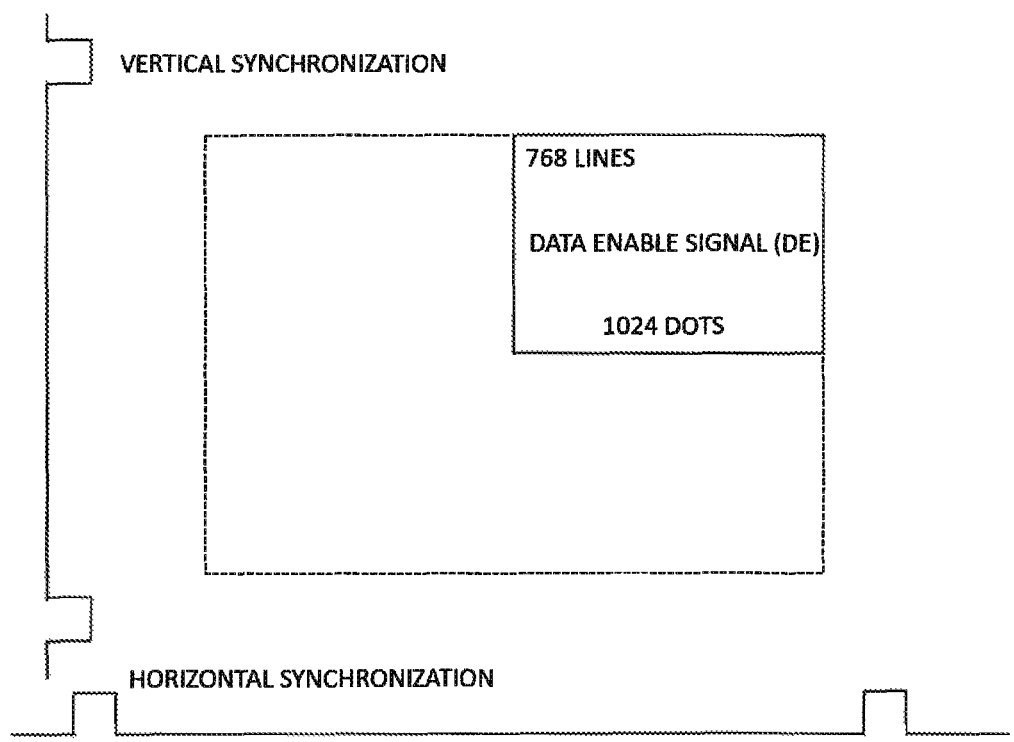

FIGS. 13(A), 13(B) are diagrams that show a video image projected in accordance with a video signal output from source device 105 in the second exemplary embodiment, and a DE signal thereof, respectively.

In the second exemplary embodiment, as shown in FIG. 13(A), a video image having a size of 2048 dots×1536 lines is projected. The video image having this size is formed by arranging four video images each having the XGA-size of 1024 dots×768 lines in two rows and two columns. The DE signal also has the same size as the video image as illustrated in FIG. 13(B). Four projectors 101 to 104 are used to display the video image, and therefore the video image is split into four split video images. FIGS. 14 to 17 are diagrams in which each show the split video image projected from each of projectors 101 to 104 and the DE signal thereof. FIGS. 14(A), 15(A), 16(A), 17(A) each show the split video image, and FIGS. 14(B), 15(B), 16(B), 17(B) each show the DE signal.

Figure 18:
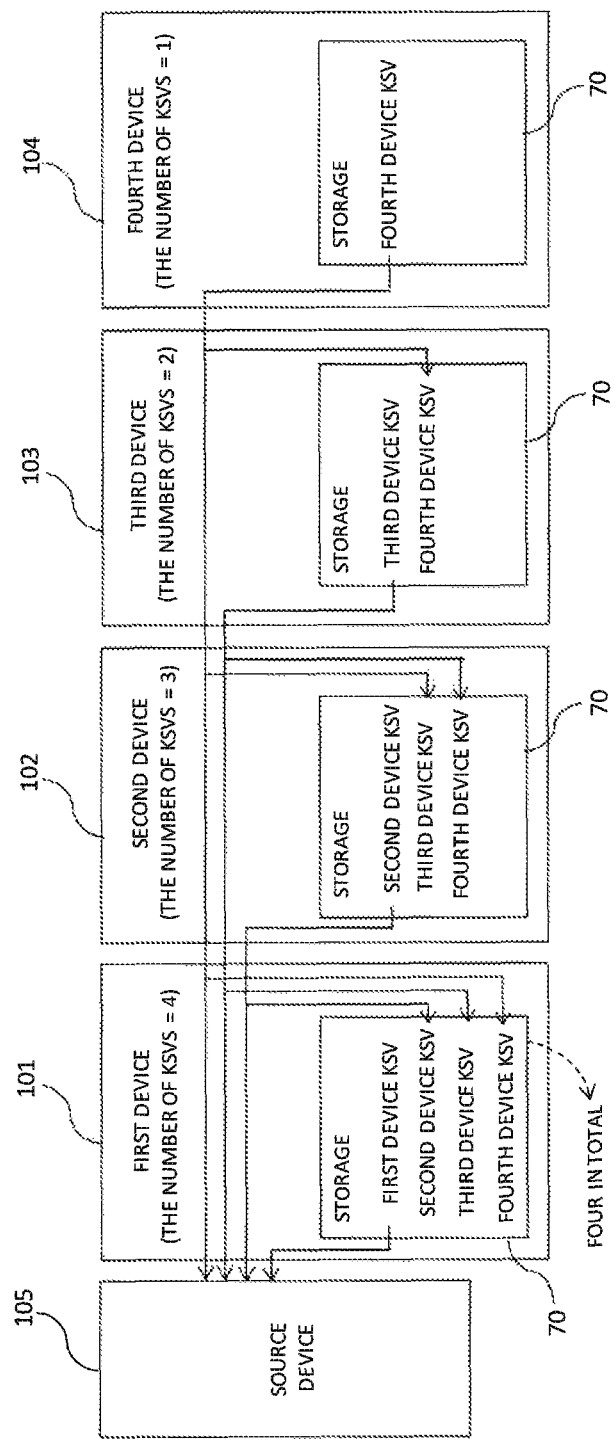
FIG. 18 is a diagram illustrating transmission states of KSVs in the second exemplary embodiment.

FIG. 18 is a diagram illustrating transmission states of KSVs.

The transmission states of KSVs are the same as those in the first exemplary embodiment. The fourth device transmits one KSV of its own projector to source device 104, the third device transmits two KSVs of its own projector and the fourth device to source device 104, the second device transmits two KSVs of the third and fourth devices and the KSV of its own projector (three KSVs in total) to source device 104, and the first device transmits three KSVs of the second to fourth devices and one KSV of its own projector (four KSVs in total) to source device 104.

Controller 60 of each projector informs controllers 60 of the other projectors of the number of KSVs transmitted to source device 104 using the wired LAN, for example. Controller 60 of each projector determines the number of projectors that are daisy-chained (the number of splits of the video image corresponding to the video signal input from the signal source) by comparing the informed number of KSVs of each projector with the number of KSVs stored in its own projector, and determines whether its own projector is the master projector or the slave projector. For example, when its own projector is disposed on the most upstream side among all of the display devices that are daisy-chained, the controller determines its own projector as the master projector. When its own projector is not disposed on the most upstream side among all of the display devices that are daisy-chained, the controller determines its own projector as the slave projector.

Figure 19:
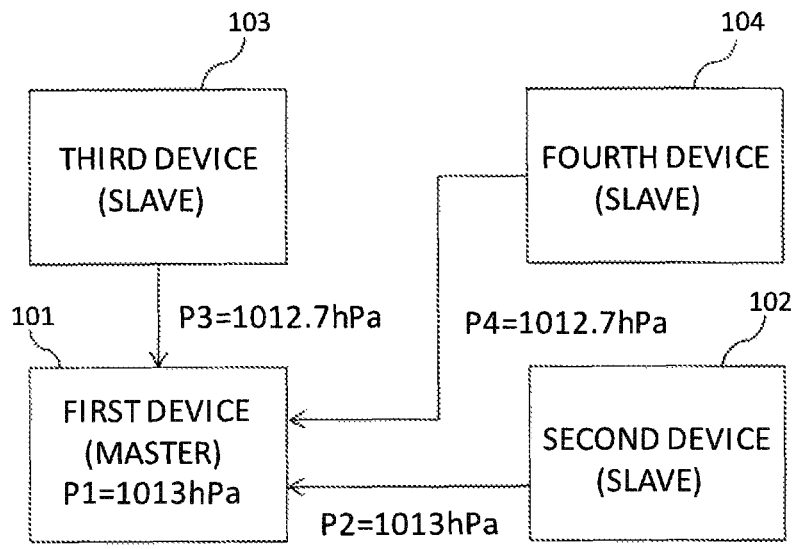
FIG. 19 is a diagram illustrating transmission states of atmospheric pressure information between the projectors in the second exemplary embodiment.

FIG. 19 is a diagram illustrating transmission states of atmospheric pressure information between the projectors.

The atmospheric pressure information pieces P2 (=1013 hPa), P3 (=1012.7 hPa), and P4 (=1012.7 hPa) measured by slave projectors 102 to 104 (second to fourth devices), respectively are transmitted to the first device that is the master projector.

Figure 20:
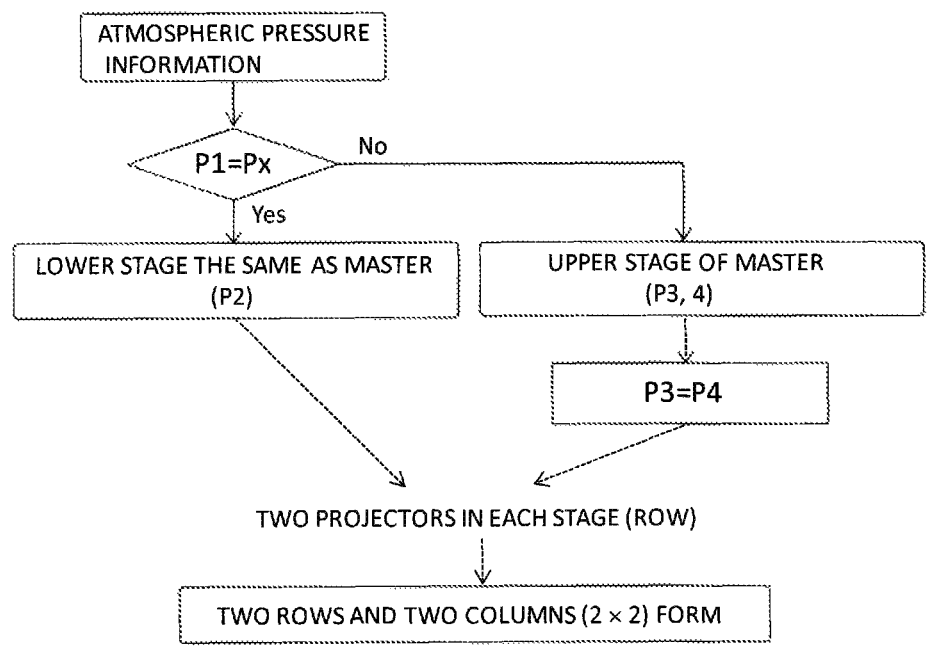
FIG. 20 is a flowchart illustrating atmospheric pressure information processing in controller 60 of a first device in the second exemplary embodiment.

FIG. 20 is a flowchart illustrating atmospheric pressure information processing in controller 60 of the first device.

As described above, the atmospheric pressure information measured by each slave projector is transmitted to the first device that is the master projector.

Controller 60 of the first device confirms the height positional relationship between the first device and each of slave projectors 102 to 104 (second to fourth devices) by comparing each piece of transmitted atmospheric pressure information with the atmospheric pressure information P1 (=1013 hPa) of the first device. As a result, it is found that the second device is installed at the same height as the first device, and the third and fourth devices are installed at a higher position than the first device. Since P3 and P4 are equal, the controller determines that the master projector is disposed at a lower stage (second row) and the third device is disposed at an upper stage (first row) form two stages (two rows), and thereby perform the multi-display at every two columns in each row.

Figure 21:
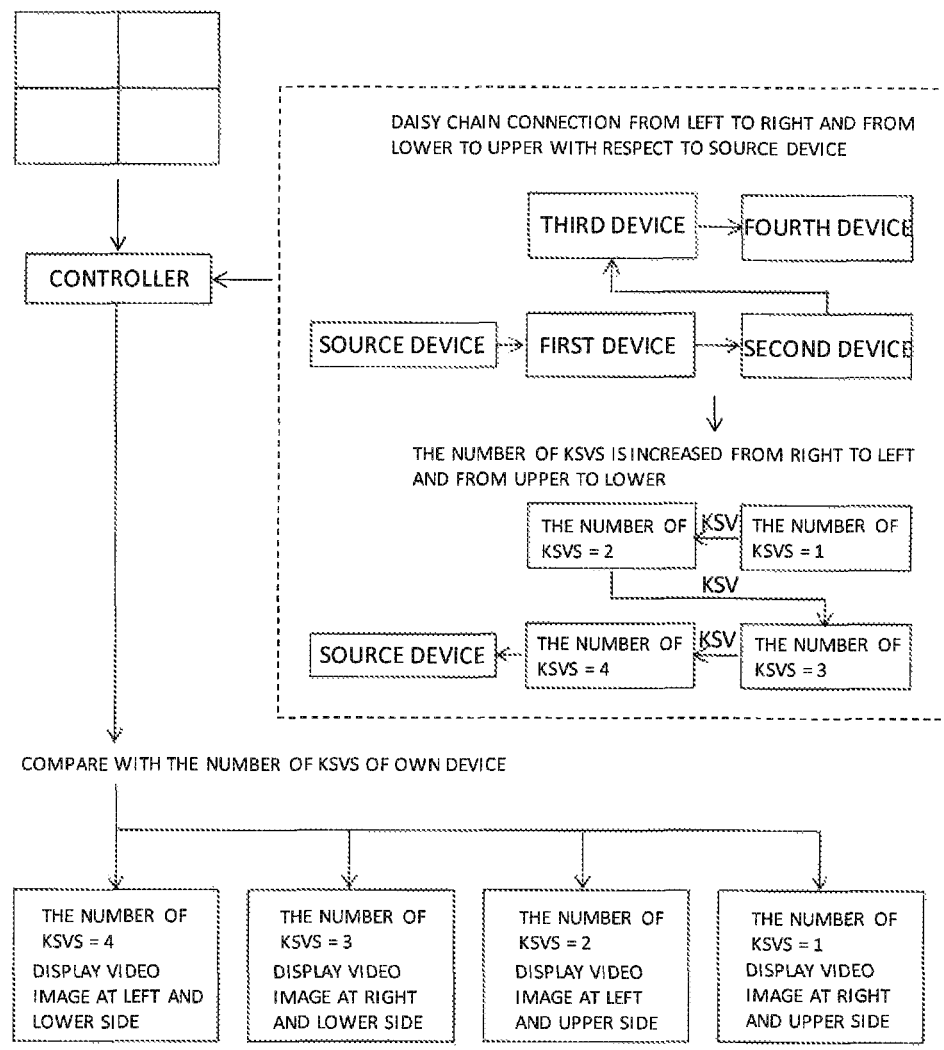
FIG. 21 is a diagram illustrating a process of determining a video image area for each projector in the second exemplary embodiment.

FIG. 21 is a diagram illustrating a process of determining a video image area for each projector.

Controller 60 of the first device as the master projector informs controller 60 of each slave projector that four projectors are connected to configure a display surface in two rows and two columns.

Controller 60 of each projector can control each display device to display the split video image based on the number of KSVs stored in the storage of the own projector in accordance with the arrangement rules in which display devices are arranged in two rows and two columns and are daisy-chained from the left side to the right side and from the lower side to the upper side.

As described above, controller 60 determines which one of the video images shown in FIG. 14 to FIG. 17 corresponds to the split video image projected by the own projector, and outputs the video signal corresponding to the display region for its own projector from video signal processor 30 to drive 40 to project the split video image. Thus, the second exemplary embodiment enables its own display device to display the split video image corresponding to its own display device using the encryption key and thereby is easily capable of displaying the split video image displayed by each display device when the display devices are daisy-chained to the signal source to perform multi-display.

The second exemplary embodiment assumes that display devices are provided in m rows and n columns, but the form of m rows and n columns includes the form in which display devices are arranged in one row as in the first exemplary embodiment, and the form in which display devices are arranged in one column.

When the display devices are arranged in one row as in the first exemplary embodiment, all pieces of atmospheric pressure information are the same, and it is found that the display devices are arranged in one row.

When the display devices are arranged in one column, all pieces of atmospheric pressure information differ from each other, and it is found that the display devices are arranged from higher atmospheric pressure to lower atmospheric pressure based on the atmospheric pressure information, thereby enabling each projector to display the split video image corresponding to its own projector.

In the second exemplary embodiment, when the display devices have the same atmospheric pressure, it is determined that they are located in the same row, but the present invention is not limited thereto. For example, when a difference between the atmospheric pressures of a specific display device and the other predetermined display device is smaller than a predetermined value, it may be determined that the two display devices are located in the same row. This can prevent an incorrect determination because of a measurement error of the atmospheric pressure sensor or a subtle difference in atmospheric pressure caused by the position. Note that a calibration or the like is performed to thereby reduce the measurement error of the atmospheric pressure sensor.

In the second exemplary embodiment, the information about the number of KSVs and the like is informed using the communication path such as the wired LAN other than the video signal transmission cable, but the present invention is not limited thereto. For example, when the information can be informed to all of the other display devices by using the video signal transmission cable, the communication path other than the video signal transmission cable can be deleted.

In the second exemplary embodiment, when display devices are arranged in one row, the display device disposed on the left side facing the screen is regarded as a first device, and the display devices are daisy-chained toward the right side, but the present invention is not limited thereto. For example, the display device disposed on the right side facing the screen may be regarded as the first device, and the display devices may be daisy-chained toward the left side. In this case, the relationship between the number of KSVs and the display position becomes reversed.

In the second exemplary embodiment, when display devices are arranged in one column, the display device disposed on the lower side facing the screen is regarded as a first device, and the display devices are daisy-chained toward the upper side, but the present invention is not limited thereto. For example, the display device disposed on the upper side facing the screen may be regarded as the first device, and the display devices may be daisy-chained toward the lower side. In this case, the relationship between the number of KSVs and the display position becomes reversed.

In the second exemplary embodiment, when display devices are arranged in m rows and n columns, the display device disposed on the left and lower side facing the screen is regarded as a first device, and the display devices are daisy-chained from the left side to the right side and from the lower side to the upper side, but the present invention is not limited thereto. For example, the display device disposed on the right and upper side facing the screen may be regarded as the first device, and the display devices may be daisy-chained from the left side to the right side and from the lower side to the upper side. In this case, the relationship between the number of KSVs and the display position becomes reversed. In addition, the display devices may be sequentially connected regarding the display device disposed at the left and upper side or the right and lower side facing the screen as the first device. The display devices arranged in the even row may be connected from the right side to the left side, and the display devices arranged in the odd row may be connected from the left side to the right side. The connection states in the row and column are replaced with each other. In other words, the connection state is preset and the relationship between the set state and the number of KSVs is stored as the arrangement rules and thereby is capable of displaying a proper split video image corresponding to the number of KSVs.

Note that in each exemplary embodiment described above, a projector is used as an example of the display device, but the present invention is not limited to the projector. A similar effect can be obtained, if a similar configuration to that in each exemplary embodiment is formed using a monitor.

Furthermore, the most characteristic feature of the present invention is the operation of the controller (CPU). The controller operates in accordance with a program stored in the storage. The program is stored in the storage in advance, or stored in the storage through an interface connecting part, and the invention of the present application includes a storage medium for storing the program.

REFERENCE SIGNS LIST 1 to 3, 101 to 104 projector (display device)
4, 105 source device (signal source)
8 wireless LAN port (interface connecting part)
60 controller
70 storage
80 atmospheric pressure sensor

The invention claimed is:

1. A display device that is daisy-chained to a signal source that outputs a video signal based on an encryption protocol, and transmits an encryption key used for encryption to the signal source, the display device comprising:
   a display that forms a video image corresponding to the video signal;
   a storage that stores the encryption key of an own display device, and the encryption keys of all of downstream side display devices that are provided on a downstream side of the own display device among all of the other display devices that are daisy-chained, the encryption keys being transmitted to the signal source through the own display device when the display devices are daisy-chained to the signal source; and
   a controller that causes said display to form a split video image that is a part of a video image based on the number of splits of the video image corresponding to the video signal and the number of encryption keys stored in said storage.

2. The display device according to claim 1, wherein
   the split video image is located at a position corresponding to the number of encryption keys stored in said storage among the split video images formed by splitting the video image by the number of splits of the video image.

3. The display device according to claim 1, wherein
   said controller is informed of the number of encryption keys from all of the other display devices, and
   the number of splits of the video image comprises a maximum number of encryption keys among the number of encryption keys informed from all of the other display devices and the number of encryption keys stored in said storage.

4. The display device according to claim 1, wherein
   said controller informs all of the other display devices of the number of encryption keys stored in said storage.

5. The display device according to claim 1, wherein
   when the own display device is disposed on the most upstream side among all of the display devices that are daisy-chained, said controller informs all of the other display devices of the number of encryption keys stored in said storage, and determines the number of encryption keys stored in said storage as the number of splits of the video image.

6. The display device according to claim 1, wherein
   when the own display device is not disposed on the most upstream side among all of the display devices that are daisy-chained, said controller determines the number of encryption keys informed from the other display device disposed on the most upstream side as the number of splits of the video image.

7. The display device according to claim 1, wherein
   the encryption key comprises a specific encryption key assigned to each of the display devices.

8. The display device according to claim 1, wherein
said storage further stores arrangement rules that are rules of arrangement in accordance with connection order when the display devices are daisy-chained to the signal source, and
said controller determines the connection order based on the number of encryption keys stored in said storage, and causes said display to form the split video image based on the determined connection order and the arrangement rules.

9. The display device according to claim 1, wherein
the encryption protocol comprises an HDCP protocol, and the encryption key comprises a KSV.

10. The display device according to claim 1, wherein
the display device is provided with an atmospheric pressure sensor, and
said controller receives atmospheric pressure information measured by the atmospheric pressure sensor from the other display device, and causes said display to form the split video image based on the received atmospheric pressure information.

11. A multi-display system, comprising
display devices according to claim 1.

12. A split video display method performed by display devices that are daisy-chained to a signal source that outputs a video signal based on an encryption protocol, and transmit encryption keys used for encryption to the signal source, the split video display method comprising:
causing a display to form a video image corresponding to the video signal;
storing, in a storage, the encryption key of an own display device, and all of the encryption keys of all of downstream side display devices that are provided on a downstream side of the own display device among all of the other display devices that are daisy-chained, the encryption keys being transmitted to the signal source through the own display device when the display devices are daisy-chained to the signal source; and
causing the display to form a split video image that is a part of a video image based on the number of splits of the video image corresponding to the video signal and the number of encryption keys stored in the storage.

13. A non-transitory computer readable record medium storing a program that causes a computer to execute a split video display method performed by display devices that are daisy-chained to a signal source that outputs a video signal based on an encryption protocol, and transmit encryption keys used for encryption to the signal source, the program causing the computer to execute the split video display method comprising:
causing a display to form a video image corresponding to the video signal;
storing, in a storage, the encryption key of an own display device, and all of the encryption keys of all of downstream side display devices that are provided on a downstream side of the own display device among all of the other display devices that are daisy-chained, the encryption keys being transmitted to the signal source through the own display device when the display devices are daisy-chained to the signal source; and
causing the display to form a split video image that is a part of a video image based on the number of splits of the video image corresponding to the video signal and the number of encryption keys stored in the storage.

* * * * *